(12) United States Patent
Matskewich et al.

(10) Patent No.: US 9,311,896 B2
(45) Date of Patent: Apr. 12, 2016

(54) GLYPH RENDERING

(75) Inventors: Tanya Matskewich, Redmond, WA (US); Gregory Hitchcock, Woodinville, WA (US); Michael Duggan, Dublin (IE); Donald David Karlov, North Bend, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/405,858

(22) Filed: Feb. 27, 2012

(65) Prior Publication Data
US 2013/0222407 A1    Aug. 29, 2013

(51) Int. Cl.
*G09G 5/28*    (2006.01)
*G06T 11/20*    (2006.01)

(52) U.S. Cl.
CPC ............... *G09G 5/28* (2013.01); *G06T 11/203* (2013.01)

(58) Field of Classification Search
CPC ........ G06T 11/203; G09G 5/24; G09G 5/222; G06F 17/214; G06K 15/02
See application file for complete search history.

(56) References Cited

U.S. PATENT DOCUMENTS

| | | | |
|---|---|---|---|
| 6,288,726 B1 | 9/2001 | Ballard | |
| 6,897,870 B1 | 5/2005 | Clegg | |
| 7,006,095 B2 | 2/2006 | Frisken et al. | |
| 7,379,076 B2 | 5/2008 | Karlov | |
| 7,505,040 B2 | 3/2009 | Stamm et al. | |
| 7,623,130 B1 | 11/2009 | Burkey | |
| 7,719,536 B2 | 5/2010 | Dowling et al. | |
| 7,787,694 B2 | 8/2010 | Fux et al. | |
| 2003/0058246 A1 | 3/2003 | Roelofs | |
| 2004/0189662 A1* | 9/2004 | Frisken et al. | ................. 345/611 |
| 2004/0227771 A1 | 11/2004 | Arnold et al. | |
| 2005/0219248 A1* | 10/2005 | Arnold | ................... G06T 11/203 345/467 |
| 2006/0012610 A1* | 1/2006 | Karlov | ......................... 345/613 |
| 2007/0188497 A1* | 8/2007 | Dowling | ............... G06T 11/203 345/469 |
| 2011/0148908 A1* | 6/2011 | Jeong | ...................... G09G 5/02 345/590 |
| 2013/0033498 A1 | 2/2013 | Linnerud et al. | |
| 2013/0057554 A1 | 3/2013 | Linnerud et al. | |

OTHER PUBLICATIONS

"Introducing DirectWrite", Retrieved at <<http://msdn.microsoft.com/en-us/library/windows/desktop/dd371554(v=vs.85).aspx>>, Retrieved Date: Nov. 29, 2011, pp. 10.

(Continued)

*Primary Examiner* — James A Thompson
(74) *Attorney, Agent, or Firm* — Micky Minhas; Judy Yee; Sunah Lee

(57) ABSTRACT

Among other things, one or more techniques and/or systems are disclosed for rendering a glyph. Rendering data for the glyph can be received, such as size, shape, color, etc., along with first sub-pixel position for initially rendering the glyph on a display. A first rendering quality can be identified for the first sub-pixel position and second rendering quality can be identified for a second sub-pixel position, which may comprise an alternate rendering position. A sub-pixel position shift can be selected for the glyph based at least upon a comparison of the first and second rendering qualities. The sub-pixel position shift can comprise a difference between the first sub-pixel position and the second sub-pixel position, where the second rendering quality is selected/preferable over the first rendering quality. The glyph can be rendered by applying the selected sub-pixel position shift.

20 Claims, 10 Drawing Sheets

(56) References Cited

OTHER PUBLICATIONS

"Fonts and Text Layout", Retrieved at <<http://docs.oracle.corn/javase/1.4.2/docs/guide/2d/spec/j2d-fonts.html#wp73059>>, Apr. 24, 2001, pp. 17.

"Text Clarity in WPF", Retrieved at <<http://windowsclientnet/wpf/white-papers/wpftextclarity.aspx>>, Retrieved Date: Nov. 30, 2011, pp. 10.

Int. Search Report cited in PCT Application No. PCT/US2013/026139 dated Jun. 24, 2013, 11 pgs.

\* cited by examiner

GLYPH RENDERING

BACKGROUND

In a computing environment, a computer font can comprise a style of characters (e.g., alphanumeric characters) in a particular typeface. Computer fonts can typically be scaled to larger or smaller sizes, bolded and/or italicized while retaining their typeface style. Characteristics of a font can comprise a stroke width (weight), character slope or angle, and character width (e.g., as well as height). Typically, a font may be comprised of a plurality of glyphs (e.g., characters, portions of characters, segments of portions of the characters, etc.), which may comprise different rendering characteristics on different displays.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

It may be appreciated that glyphs of a font may make up characters and/or portions of characters of the font. For example, a glyph may comprise an entire character of the font, or rather the character may be comprised of merely a single glyph. A character can also, in some instances, be comprised of multiple glyphs. It may be appreciated that "character" and/or the like may be regarded in the art as comprising a semantic meaning while "glyph" is generally regarded as a pictorial representation of a character. For example, the letter B is a character that has the semantic meaning of the /b/ phonetic sound and there are several potential glyphs that can represent that character, including B, b, or even a rebus picture of a bee.

It may be appreciated that different techniques may be implemented when rendering glyphs, but that some of these techniques can, in some instances, result in an undesirable viewing experience. For example, "over-blurring," may occur where anti-aliasing techniques are implemented to address issues such as pixilation and/or artifacts, such as when attempting to render high resolution objects (e.g., text) on a low resolution display. Poorly rendered glyphs (e.g., overly blurry text) may be more difficult to read, providing a reduced user experience.

Accordingly, among other things, one or more techniques and/or systems are disclosed for improving rendering quality of glyphs. A glyph can comprise rendering data, such as size, shape, color, etc., along with an initial rendering position on a display. The initial rendering position may comprise a sub-pixel position, whose rendering quality can be compared with rendering qualities of one or more alternate sub-pixel rendering positions for the glyph. If a more desirable rendering quality (e.g., relative to a rendering quality associated with an initial position) is identified, the associated alternate sub-pixel position can be selected for rendering the glyph.

In one embodiment of rendering a glyph, the glyph and a first sub-pixel position for the glyph can be received. Further, a sub-pixel position shift can be selected for the glyph based at least upon a rendering quality for the glyph at a second sub-pixel position. The sub-pixel position shift may comprise a difference between the first sub-pixel position and the second sub-pixel position. Additionally, the glyph can be rendered, such as on a display, by applying the sub-pixel position shift to the first sub-pixel position.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
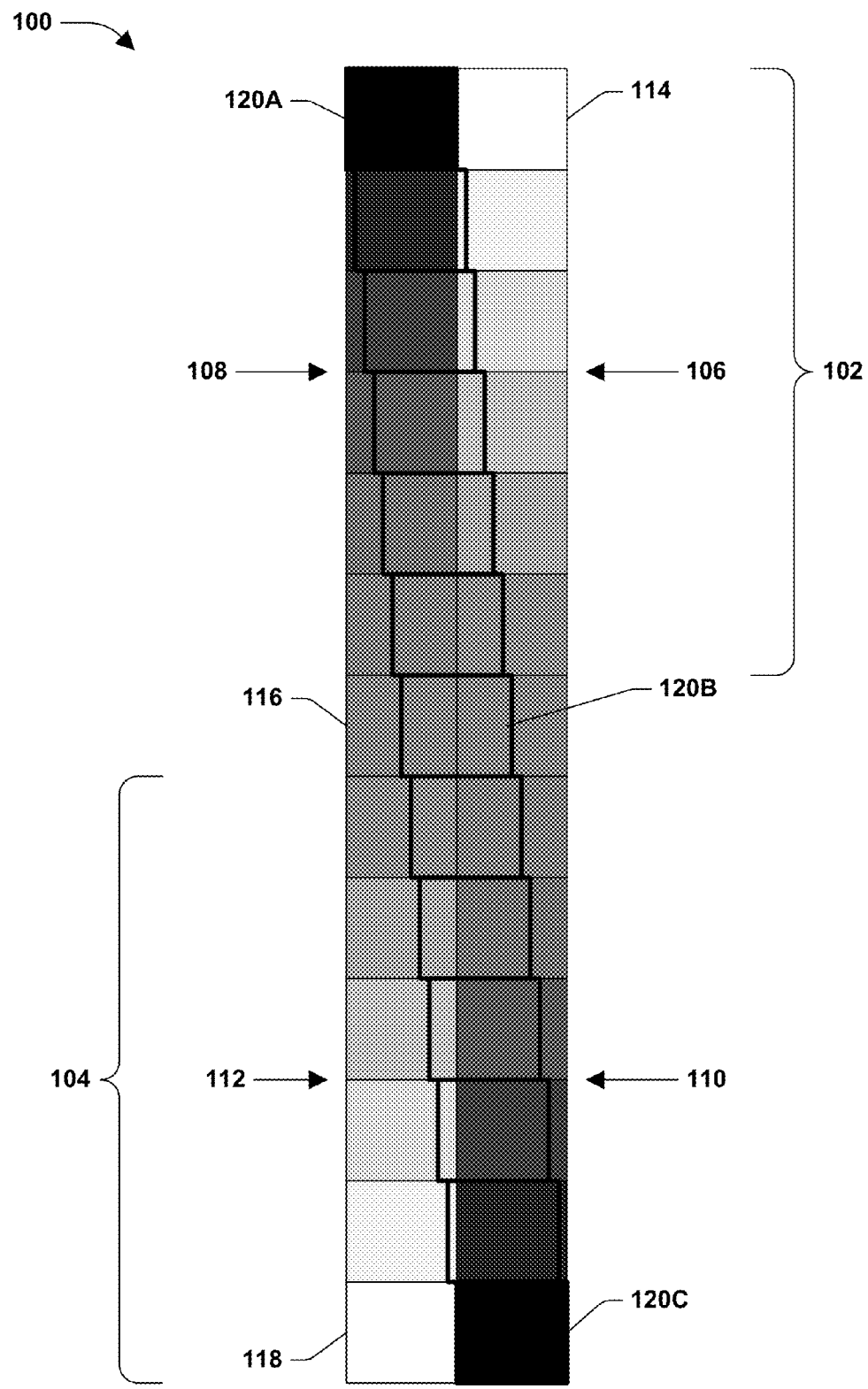
FIG. 1 is a diagram illustrating an example embodiment of rendering image elements.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

FIG. 1 is a diagram illustrating an example embodiment 100 of gray-scale rendering of image elements, such as pixels, sub-pixels, etc. (e.g., which may correspond to a glyph or portions of a glyph). As an example, gray-scale rendering (e.g., or color rendering) can comprise a scale-over factor, which may indicate a number of shades (e.g., of gray) from white (no-shade) to black (full-shade). In this example embodiment 100 a 12×1 scale-over factor is illustrated, although other scale-over factors may be utilized in gray-scale rendering, such as an 8×1, 6×5, etc. scale-over factor (e.g., where 6×5 would allow for scaling/shifting in both horizontal and vertical directions). Further, for example, a color-scale rendering may utilize a similar scale-over factor, where various shades of a color may be applied to image elements.

In one embodiment, an image element may comprise a pixel. Often, "pixel" is used to describe a unit of an image, for example, where the unit may comprise a smallest element of the image that can be represented and/or controlled. As one example, a pixel may comprise an addressable screen element of a display device (e.g., screen pixel, sub-pixel), a single point in a raster image, and/or a single point in a printed picture. Further, as an example, a "pixel" may comprise an "address" corresponding to coordinates (e.g., X, Y coordinates, row and column coordinates, Euclidean space coordinates, etc.) for the image, and/or display screen. In one embodiment, the image element may comprise any type of image "unit" (e.g., pixel, sub-pixel, etc.) that can be represented and/or controlled. Typically, for example, an image can be comprised of a plurality of pixels, arranged in rows and/or columns (e.g., or some other pattern), to create objects (e.g., glyphs and/or portions of glyphs), colors, shades, tones, etc., within the image.

In the example embodiment 100, a first set 102 comprises six pairs of pixels, and a second set 104 comprises a different six pairs of pixels. In this embodiment, for example, the respective pairs of pixels may represent a same physical pixel pair (e.g., on a display screen), merely comprising a different view of the pair (e.g., at a different relationship between shades of gray of the pixels). That is, for example, the thirteen pixel pairs may indicate a gradual shift in shades of gray (e.g., using the 12×1 scale-over factor and 13 shades of gray, for example, where white may be referred as a $1^{st}$ shade and black may be referred as a $13^{th}$ shade) between a first pixel and a second pixel, where color of the first pixel starts at black and shifts to white, and color of the second pixel starts at white and shifts to black. It may be appreciated, however, that FIG. 1 is merely an example, and scale-over factors (and number of shades of gray) used in sampling, for example, may vary depending upon a number of factors, such as a width of a rendering filter and associated coefficients, as well as over-scale factors, for example.

In the first set 102, a right pixel or first side 106 of the pixel pairs shifts shades from white (e.g., $1^{st}$ shade of gray) to a sixth gray shade, and a left pixel or second side 108 of the pixel pairs shifts from black (e.g., $13^{th}$ shade of gray) to an eighth gray shade. Further, in the second set 104, still moving from top to bottom, a right pixel or first side 110 shifts shades from the eighth gray shade to black (e.g., $13^{th}$ shade of gray), and a left pixel or second side 112 shifts from the sixth gray shade to white (e.g., $1^{st}$ shade of gray). Further, at a second pair 116, the respective pixels comprise a same shade of gray (e.g., a middle (seventh) shade between black and white). That is, for example, a gray-scale lumina value can be adjusted for the respective pixels, where a higher lumina value may comprise a lighter gray (e.g., highest lumina (white) may correspond to the lowest shade of grade calculated based on over-scale factors) than a lower lumina value (e.g., lowest lumina (black) may correspond to the highest shade of gray calculated based on over-scale factors).

In one embodiment, shifting the gray-scale level from black (e.g., lowest lumina value) in the first pixel of the pixel pair to white (e.g., highest lumina value), and shifting the gray-scale from white in the second pixel of the pixel pair to black over the 12×1 scale-over, may illustrate how an object (e.g., glyph) may (appear to) be rendered at different locations (e.g., sub-pixel positions) between two pixels. That is, for example, a type of "virtual" sub-pixel position may be indicated by the lumina values in two adjacent pixels.

For example, a first pair 114 may indicate a first sub-pixel position 120A (e.g., comprising merely the first pixel, which is shaded black), a second pair 116 may indicate a second sub-pixel position 120B (e.g., where the pixels respectively comprise a same shade of gray), and a third pair 118 may indicate a third sub-pixel position 120C (e.g., comprising merely the second pixel, which is shaded black), completing the shift of the virtual sub-pixel position (e.g., a glyph over virtual sub-pixel grid) from the first pixel in the pair to the second pixel in the pair. As one example, when a pixel pair (e.g., 114, 116 or 118) is viewed from a distance, such as by a user viewing a display, the individual pixels may not be distinguishable by the viewer (e.g., as they are too small to be distinguished by human vision); instead, a rendered object (e.g., glyph) may appear to be at a particular location or position based upon the respective lumina values of the pixels in the pixel pair (e.g., at times referred to as sub-pixel position, or virtual sub-pixel position). Thus, based upon the respective lumina values of the pixels in the pixel pairs, the first pair 114 may appear to comprise a first sub-pixel position 120A at a first location, the second pair 116 may appear to comprise a second sub-pixel position 120B at a second location (e.g., shifted somewhat from the first location), and the third pair 118 may appear to comprise a third sub-pixel position 120C at a third location (e.g., shifted somewhat from the second location, and shifted even further from the first location).

Typical glyph rendering techniques, such as for rendering text, may produce a loss of quality, for example, due to over-blurring of glyphs. As provided herein, among other things, a method may be devised that can provide for rendering a glyph in a desired (e.g., more desirable) view. A location for rendering a glyph can be chosen by identifying a rendering quality of the glyph at one or more sub-pixel positions, and selecting a sub-pixel position that provides the desired view of the glyph (e.g., desired quality, positioning relative to other glyphs, etc.). The glyph can be rendered, such as on a display for a user, using the selected sub-pixel position, for example.

Figure 2:
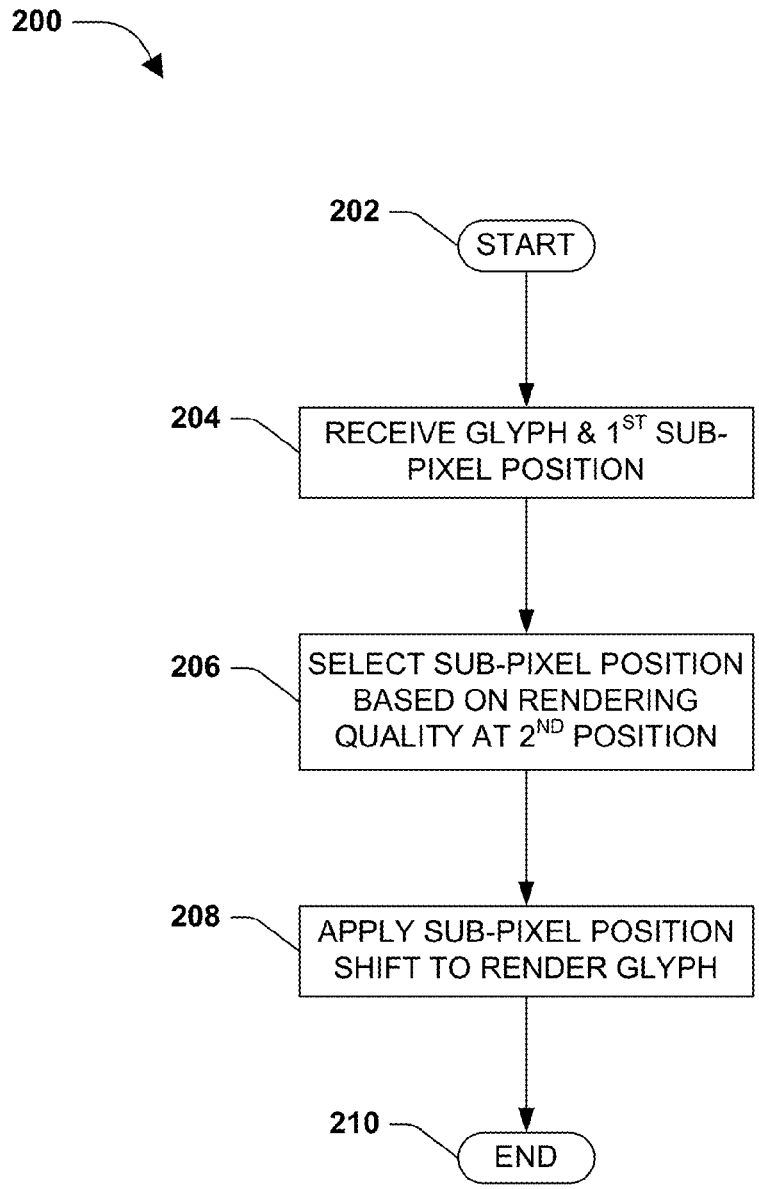
FIG. 2 is a flow diagram illustrating an exemplary method for rendering a glyph.

FIG. 2 is a flow diagram illustrating an exemplary method 200 for rendering a glyph. The exemplary method 200 begins at 202. At 204, the glyph and a first sub-pixel position for the glyph is received (e.g., by a computer-based glyph rendering component). As one example, the first sub-pixel position may comprise an initial sub-pixel position for rendering the glyph on a display, such as a position indicated by an application (e.g., or combination of applications) providing the glyph. For example, when preparing to render glyphs on a display, one or more applications may provide respective glyphs along with their corresponding initial sub-pixel positions.

At 206, a sub-pixel position shift is selected for the glyph based at least upon a rendering quality for the glyph at a second sub-pixel position. The sub-pixel position shift comprises a difference between the first sub-pixel position (e.g., initial sub-pixel position) and the second sub-pixel position. As one example, a rendering quality can comprise an objective measurement of user viewing clarity of the glyph, such as in relation parts of the glyph and/or to other rendered glyphs. For example, when anti-aliasing techniques are applied to rendering of a glyph, a certain amount of "blur" may be perceived by a user. The "blur" may be a result of using certain shades of gray (e.g., "mid-range" gray shades) in adjacent pixels (e.g., comprising a portion of the glyph) when rendering the glyph (e.g., particularly when using low resolution monitors), which may result in "soft" edges for a rendered glyph, for example.

In one embodiment, one or more second sub-pixel positions may be identified for rendering at least a portion of the glyph, and a corresponding rendering quality can be determined for the respective one or more second sub-pixel positions. In this embodiment, the second sub-pixel position that comprises a desired rendering quality (e.g., a low amount of "blur") may be selected. Further, in this embodiment, a difference between the first sub-pixel position and the selected second sub-pixel position can be determined (e.g., a difference between sub-pixel position 120B and sub-pixel position 120C in FIG. 1).

At 208, the glyph can be rendered by applying the sub-pixel position shift. As one example, the sub-pixel position shift can be combined with the first sub-pixel position for respective one or more portions of the glyph, and the resulting combination can be used to render the glyph. For example, the combination of an initial position for the glyph and the sub-pixel position shift may result in a rendering position for the glyph on a display used by a user viewing the glyph. In this way, for example, the resulting rendered glyph may comprise a desired rendering quality, thereby improving a user's viewing experience.

Having rendered the glyph, the exemplary method 200 ends at 210.

Figure 3:
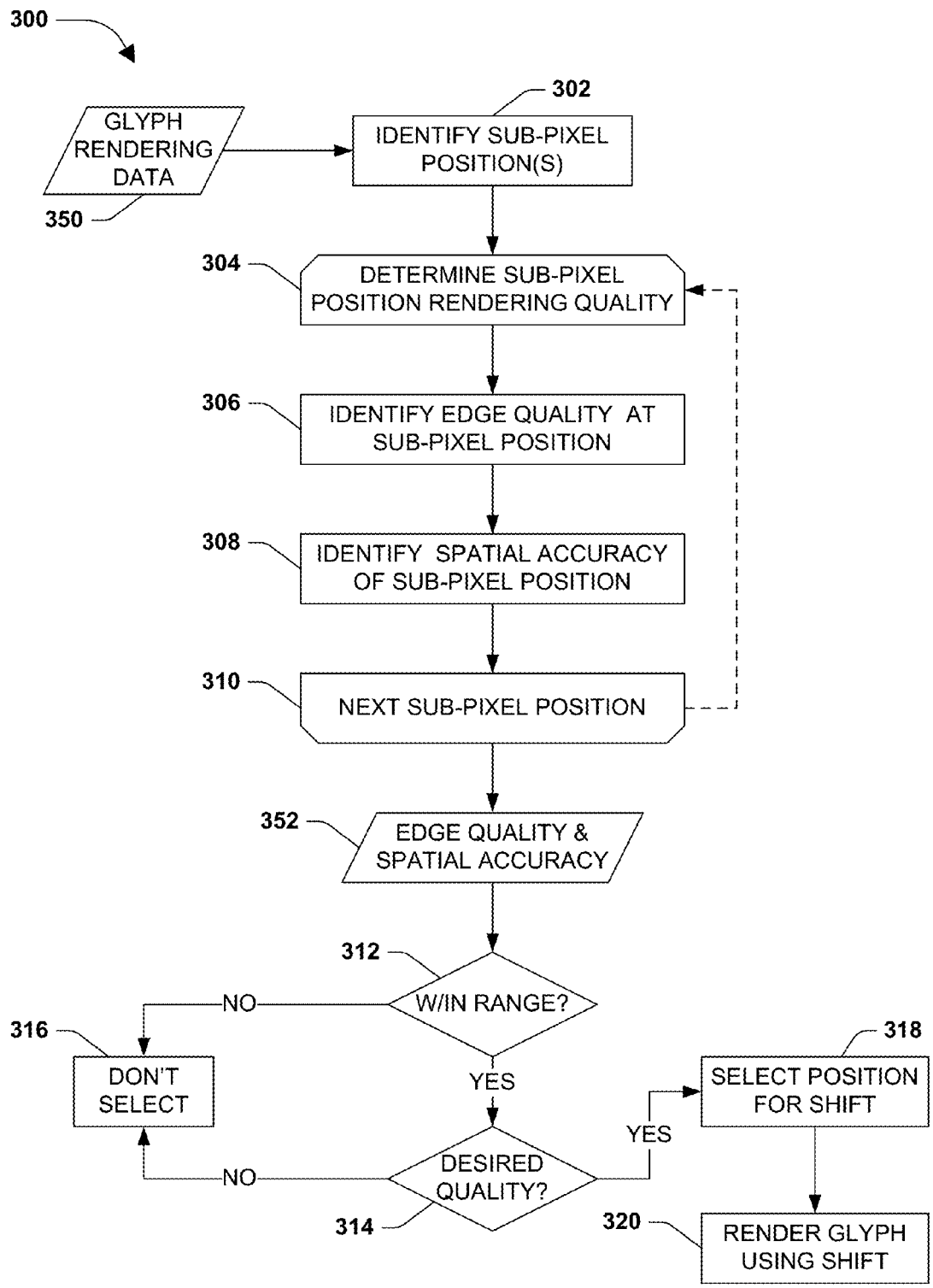
FIG. 3 is a flow diagram illustrating an example embodiment where one or more portions of one or more techniques described herein may be implemented.

FIG. 3 is a flow diagram illustrating an example embodiment 300 where one or more portions of one or more techniques described herein may be implemented. At 302, one or more sub-pixel positions may be identified for a glyph comprised in glyph rendering data 350. As one example, the glyph rendering data 350 may comprise glyph image information (e.g., describing the shape, size, color, etc. of the glyph) and a corresponding first (e.g., initial/current) sub-pixel position for rendering for the glyph (e.g., for a display on which the glyph is to be rendered). In this example, one or more second sub-pixel positions may identified, where the one or more second sub-pixel positions can respectively comprise an alternate (e.g., to the initial/first position) glyph rendering sub-pixel position.

In one embodiment, a second sub-pixel position may comprise a "virtual" sub-pixel position for at least a portion of the glyph, which is different than the first sub-pixel position. As one example, as described in FIG. 1, a "virtual" sub-pixel position can comprise a particular arrangement of gray-scale shades (e.g., or color-scale shades) between adjacent image elements (e.g., pixels, physical sub-pixels, etc.). In this example, the first sub-pixel position may comprise a first arrangement of gray-scale shades between a first and second pixel, and the second sub-pixel position can comprise a second arrangement of the gray-scale shades between the first and second pixel.

For example, a first sub-pixel position may comprise a lowest gray shade (e.g., white) in the first pixel and a highest gray shade (e.g., black) in the second pixel, while a second sub-pixel position may comprise a highest gray shade (e.g., black) in the first pixel and a lowest gray shade (e.g., white) in the second pixel. It can be appreciated that there may be varying gray shades among (any number of) sub-pixel pairs between such first and second sub-pixel positions.

At 304 in the example embodiment 300, a sub-pixel position rendering quality can be determined for at least a portion of the glyph, for the respective one or more identified sub-pixel positions. Determining the rendering quality can comprise identifying, at 306, an edge quality for at least a portion of the glyph, at the sub-pixel position. As one example, a glyph can comprise a font character, which may be made up of one or more edges (e.g., a text letter comprising straight lines and/or curves). In this example, an edge quality may be quantified, and an edge quality value can be used to determine at least a portion of the rendering quality at that sub-pixel position.

In one embodiment, the edge quality may be determined by identifying a perceived sharpness of an edge from one or more portions of the glyph. As one example, edge "blur" can affect perceived edge sharpness. For example, edge "blur" may result from attempts at smoothing font characters, such as when anti-aliasing techniques are applied to character rendering on a display. Anti-aliasing can be used to smooth artifacts, such as "pixilation," which may result from attempting to display a high resolution image (e.g., a font character) on a lower resolution display. Some forms of anti-aliasing apply a type of "blurring" technique to reduce the appearance of "pixilation" to a viewer, for example, by manipulating the gray-scale (e.g., or color scale) shades of pixels adjacent to an object edge.

In this embodiment, for example, the perceived sharpness of the edge of the glyph may be quantified by identifying an amount of edge "blur," such as by identifying the gray-scale shade difference between adjacent pixels at an edge. As one example, in FIG. 1, an edge identified at sub-pixel positions 120A and/or 120C may comprise a higher perceived edge sharpness (e.g., less blur) than an edge identified at sub-pixel position 120B. In this example, the gray-scale shade difference between the adjacent pixels at sub-pixel positions 120A and/or 120C is greater than the gray-scale shade difference between the adjacent pixels at sub-pixel position 120B.

Returning to FIG. 3, determining the sub-pixel position rendering quality can comprise identifying a spatial accuracy of the sub-pixel position, at 308. In one embodiment, the spatial accuracy of the sub-pixel position can be determined by identifying a sub-pixel position shift. As one example, the sub-pixel position shift for the sub-pixel position can be determined by identifying the number of virtual sub-pixel positions the from the initial sub-pixel position to the sub-pixel position for which the rendering quality is being determined.

For example, if the first sub-pixel position (e.g., initial) and the second sub-pixel position (e.g., for which the rendering quality is being determined) are a same position, the sub-pixel position shift can comprise zero. As another example, if the number of virtual sub-pixel positions the from the first sub-pixel position to the second sub-pixel position comprises one, the sub-pixel position shift for the second sub-pixel position can comprise one (e.g., and so-on for two positions, etc.). In one embodiment, the rendering quality for the sub-pixel position can comprise a combination 352 of the identified edge quality (e.g., perceived sharpness) and the spatial accuracy (e.g., distance from the initial sub-pixel position). At 310, a rendering quality for a next sub-pixel position, if available, can be determined, at 304.

At 312, the spatial accuracy for the sub-pixel position may be compared with a desired spatial accuracy range. If the spatial accuracy for the sub-pixel position is not comprised within the desired spatial accuracy range (NO at 312) the sub-pixel position may not be selected for rendering the glyph, at 316. As one example, over-shifting the sub-pixel position for rendering the glyph may result in undesirable viewing properties. For example, if a first font character (e.g., "r") is rendered too close to a second font character (e.g., "n"), the rendered combination may result in a merging of the characters to a viewer (e.g., human viewer), creating a potential for misinterpretation (e.g., of the text, as an "m"). Therefore, in one embodiment, the desired spatial accuracy range may comprise sub-pixel position shift range (e.g., +/−two sub-pixel positions from the initial sub-pixel position), comprising the first sub-pixel position (e.g., as the median of the range).

In one embodiment, if the spatial accuracy for the sub-pixel position is comprised within the desired spatial accuracy range (YES at 312), the identified edge quality for the sub-pixel position may be compared with a desired edge quality, at 314. In one embodiment, the desired edge quality may comprise the highest edge quality of respective sub-pixel positions in a set of sub-pixel positions that are comprised within the desired spatial accuracy range. That is, for example, the rendering quality for the respective one or more identified sub-pixel positions (e.g., at 302) can be determined, and, from the one or more identified sub-pixel positions that meet the desired spatial accuracy range, the sub-pixel position comprising the highest edge quality can be selected for rendering the glyph.

If the sub-pixel does not meet the desired edge quality (NO at 314) (e.g., those not having the highest edge quality), the sub-pixel position is not selected for rendering the glyph, at 316. If the sub-pixel does meet the desired edge quality (YES at 314) the sub-pixel position is selected for the sub-pixel position shift, at 318. The sub-pixel position shift, for example, can be determined by identifying the number of virtual sub-pixel positions from the initial (e.g., first) sub-pixel position to the selected sub-pixel position (e.g., second). As one example, if the first and second sub-pixel positions comprise a same sub-pixel position (e.g., the initial sub-pixel position comprises the highest edge quality), the sub-pixel position shift can comprise zero.

At 320, the glyph can be rendered using the identified sub-pixel position shift. As one example, the identified sub-pixel position shift can be applied to the glyph rendering data 350, resulting in the glyph being rendered at a desired location on a display, which may provide a desired viewing experience for a viewer (e.g., text that is easier to read). As an illustrative example, if the sub-pixel position shift comprise negative one (−1) sub-pixel position, the glyph may be rendered one sub-pixel position to the left of the initial sub-pixel position (e.g., for a display comprising an X-Y grid-based pixel arrangement).

It will be appreciated that the sub-pixel position shift is not limited to any particular image element arrangement (e.g., pixel arrangement for a display). As one example, a display's image elements may comprise an alternate arrangement (e.g., a hexagonal arrangement where a pixel is surrounded on six sides by adjacent pixels, or any other potential arrangement), and the sub-pixel position shift may identify a direction and a shift number (e.g., five-one, identifying a shift of one on the fifth side).

Figure 4:
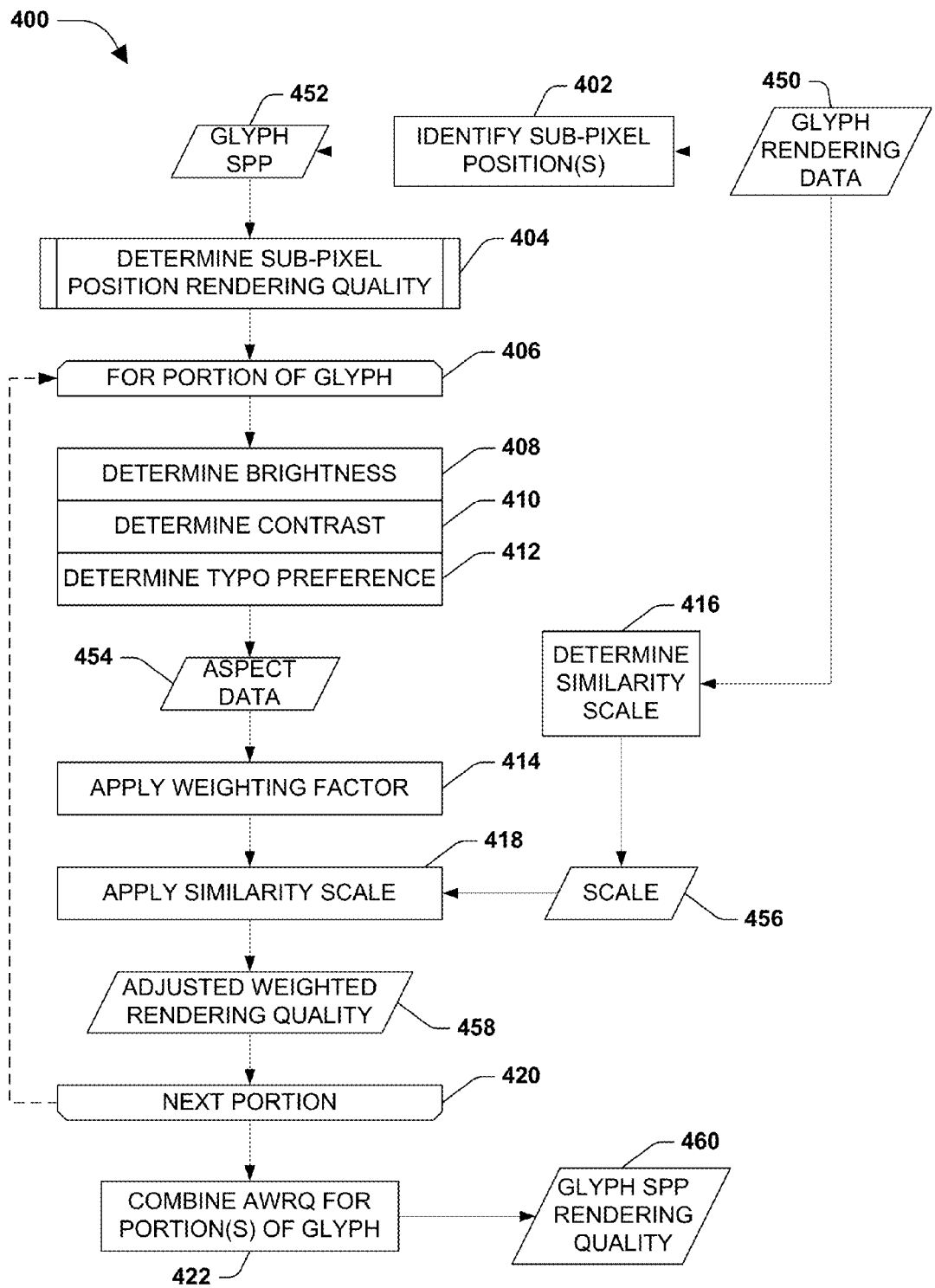
FIG. 4 is a flow diagram illustrating an example embodiment where one or more portions of one or more techniques described herein may be implemented.

FIG. 4 is a flow diagram illustrating an example embodiment 400 where one or more portions of one or more techniques described herein may be implemented. At 402, one or more sub-pixel positions (SPP) 452 for a glyph can be identified from glyph rendering data 450 (e.g., comprising information for rendering a shape, color, etc. of glyph, and/or initial rendering position of glyph). As one example, the one or more sub-pixel positions 452 for the glyph can comprise a first (e.g., the initial) sub-pixel position and one or more second (e.g., alternate) sub-pixel positions. At 404, a rendering quality 460 can be determined for the respective one or more identified sub-pixel positions 452.

Determining the rendering quality 460 for a glyph can comprise identifying rendering aspects for one or more portions of the glyph at the sub-pixel position. As one example, a font character may comprise one or more vertical portions (e.g., a vertical run), one or more horizontal portions (e.g., a horizontal run) and/or one or more curved portions. As another example, a glyph may comprise one or more "boundary" locations, where a boundary location can comprise a boundary between an interior and exterior portion of the glyph (e.g., as delineated by an outline of the glyph). In one embodiment, one or more rendering properties can be identified for the respective portions of the glyph that may be rendered at the sub-pixel position.

At 406, for at least a first portion of the glyph, one or more rendering aspects 454 may be determined. A brightness value aspect may be determined, at 408, a contrast value aspect may be determined, at 410, and/or a typographical preference aspect may be determined, at 412. In one embodiment, a brightness value (e.g., lumina value of gray-scale shades) may provide an aspect of the rendering quality with respect to a high, low or middle value. For example, a pixel comprising a mid-range brightness value (e.g., middle gray-scale level) may be less desirable (e.g., than a high (white) or low (black) value), as mid-range brightness can result in a lower perceived sharpness of the portion of the glyph (e.g., increased "blur"). Further, other rendering quality considerations may also be considered when using a brightness value in the rendering quality. For example, a fully black pixel (e.g., lowest brightness value) may be less desirable than a higher brightness value, as fully-black pixels can result in "over-sharpening" of the portion of the glyph.

In one embodiment, the "contrast" value may provide an evaluation of a difference between adjacent rendering elements (e.g., a speed of transition between gray-scale shadings in the respective pixels). As one example, for 12×1 gray-scale rendering, a contrast value indicative of a contrast measurement in horizontal direction may evaluate a speed of transition as well as desired variation between foreground and background. For example, two adjacent pixels comprising middle gray values, surrounded by a uniform background, may provide a less desirable contrast value than a pixel comprising a same middle gray value adjacent to a black pixel. The contrast value aspect of the rendering quality may indicate a presence of "blur" of the portion of the glyph, for example, and may also account for the blur based on context (e.g., width of a glyph component and/or background). As one example, a particular amount of blur on a vertical edge of the glyph comprising a black line (e.g., "back-bone") may comprise a more desirable contrast value than a same vertical edge without the black line, having the same amount of blur.

In one embodiment, a "typographic preference" aspect may provide an evaluation of glyph characteristics. In one example, a typographic preference may comprise one or more typographic rules that are established by a designer of the glyph, which may contribute to improving perceived rendering quality. As one example, a presence of vertical runs having a darker "leading edge" (e.g., a darker left edge in case of a Latin script) may indicate a particular rendering preference of the glyph. Further, as another example, a desired expected distance between glyph characters of a font (e.g., desired spacing of text in a word, such as "r" adjacent to "n", for example) can provide an aspect of the rendering quality. In this embodiment, for example, the typographical preference may be identified from the glyph rendering data 450 (e.g., a font file).

In one embodiment, a weighting factor may be applied to one or more of the respective rendering quality aspects 454 (e.g., brightness, contrast and/or typographical preference), at 414. As one example, a weighting factor may indicate relative importance of one of the aspects. In one embodiment, a first weighting factor may be applied to the brightness value, a second weighting factor may be applied to the contrast value and/or a third weighting factor may be applied to the typographical preference aspect.

As one example, one or more of the first, second and third weighting factors may comprise a zero (e.g., resulting in no weighting of the aspect). A determination of the one or more weighting factors, for example, may be based at least upon a type of display (e.g., resolution, size, color, screen type, image element arrangement, etc.), scaling of the glyphs (e.g., font size), color of the glyphs, typographic arrangement of the glyphs, etc.

In one embodiment, at 418, a similarity scale 456 may be applied to one or more of the weighted rendering quality aspects. As one example, aspect values may be further weighted by other characteristics that can impact rendering of a glyph (e.g., a text element). For example, presence of long "runs" (e.g., vertical and/or horizontal sequences of pixels) comprising a same or similar aspect value may affect rendering quality. As an example, when a vertical glyph run comprises pixels having the same aspect values, blur may become more noticeable than for a diagonal run that does not have a long vertical sequence of pixels with the same values. Therefore, for example, vertical runs of image elements (e.g., pixels, physical sub-pixels) comprising a same or similar value can be identified (e.g., by calculating correlation between rows of an over-scaled bitmap).

At 416, a similarity scale can be determined for at least the portion of the glyph. As one example, for respective boundary locations (e.g., between a line of the glyph and an adjacent edge of the glyph), a measure of vertical similarity can be determined between glyph shape at the location and one or more neighboring locations in a same run direction (e.g., vertical or horizontal). In this example, those runs of image elements comprising a same or similar value can be identified, and an increase penalty weight may be provided that is proportional to length of the run. For example, if pixels along a vertical run have a same "undesired" contrast value (e.g., suboptimal contrast value), a contrast value weighting penalty may be applied to pixels located in that particular run (e.g., in an attempt to mitigate potential blur).

In one embodiment, the adjusted, weighted rendering quality aspects may be combined, resulting in an adjusted, weighted rendering quality 458 for the selected sub-pixel position, for the selected portion of the glyph. At 420, a next portion of the glyph, if available, may be iterated through the rendering quality determination (406 to 420), for example, at least until the adjusted, weighted rendering quality is determined for the respective one or more portions of the glyph. At 422, the adjusted, weighted rendering quality for the respective portions of the glyph can be combined, resulting in a rendering quality for the glyph at the selected sub-pixel position. As one example, the rendering quality for the glyph at the selected sub-pixel position may comprise a sum of the adjusted, weighted rendering quality for the respective portions of the glyph.

Figure 5:
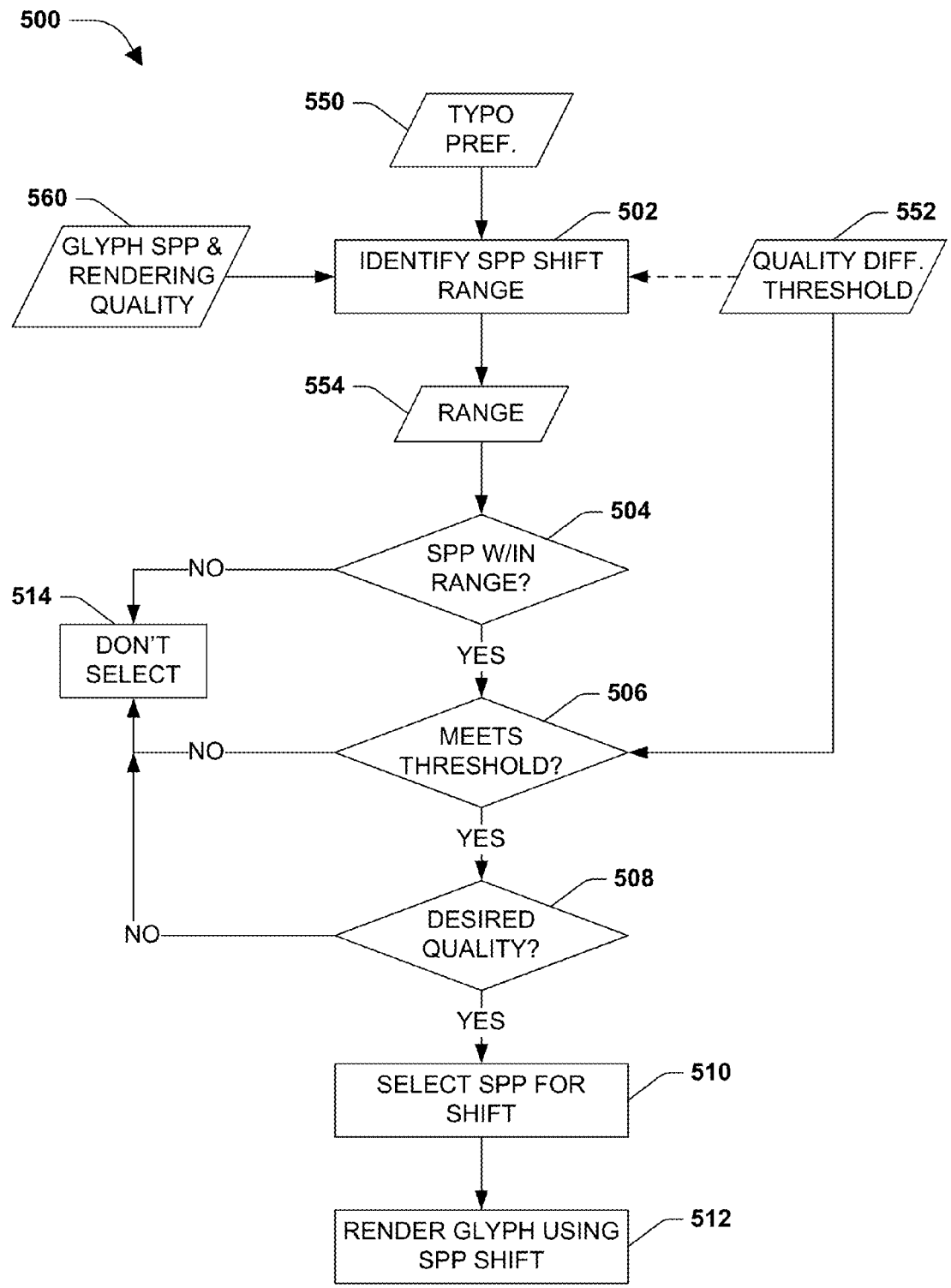
FIG. 5 is a flow diagram illustrating an example embodiment where one or more portions of one or more techniques described herein may be implemented.

FIG. 5 is a flow diagram illustrating an example embodiment 500 where one or more portions of one or more techniques described herein may be implemented. At 502 in the example embodiment 500, a sub-pixel position (SPP) shift range 554 may be identified. In one embodiment, determining the desired sub-pixel position shift range 554 can be based on a desired rendering quality difference threshold 552. Further, determining the desired sub-pixel position shift range 554 can be based on a desired typographic preference 550 for the glyph.

As one example, potential sub-pixel position shifts can be limited (e.g., the range 554 can be defined) based on a potential of rendering quality improvement for the current glyph. For example, if the rendering quality of a glyph does not vary enough between different sub-pixel positions, it might be preferable to mitigate one or more of the potential shifts, because shifting the glyph may not result in significant improvement of rendering quality while compromising spatial accuracy.

As another example, the desired sub-pixel position shift range 554 may be based on expected amount of space to an adjacent glyph (e.g., as provided by a typographic preference 550). For example, as described above, when glyphs are rendered too close to one other, a viewer may perceive the glyphs as merged. Thus, even where a potential sub-pixel position shift may comprise a desired rendering quality (e.g., highest), the shift may be denied (e.g., not be included within range 554) if the shift may result in the glyph being perceived as merged with a neighboring glyph (e.g., a very crisp, non-blurry "r" may nevertheless blend with an adjacent "n" to undesirably appear as an "m"). Further, any typographic characteristics of a set of characters (e.g., a font) may be considered when evaluating constraints for the potential sub-pixel position shifts, and determining the desired sub-pixel position shift range 554.

At 504 in the example embodiment 500, a first sub-pixel position from the one or more sub-pixel positions 560, respectively comprising a rendering quality, can be compared with the desired sub-pixel position shift range 554. If the first sub-pixel position is not comprised in the desired sub-pixel position shift range 554 (NO at 504) the first sub-pixel position may not be selected for rendering the glyph, at 514.

If the first sub-pixel position is comprised in the desired sub-pixel position shift range 554 (YES at 504) the rendering quality of the first sub-pixel position may be compared with the desired rendering quality difference threshold 552, at 506. If the rendering quality of the first sub-pixel position does not meet the desired rendering quality difference threshold 552 (NO at 506) the first sub-pixel position may not be selected for rendering the glyph, at 514.

As one example, if a rendering quality improvement between the rendering quality of the initial sub-pixel position and the rendering quality of the first sub-pixel position doesn't meet a desired threshold of improvement, the shift may not be applied. Further, in one embodiment, the desired rendering quality difference threshold 552 may also comprise a limit for "over-sharpening" of a glyph. As one example, if a difference between the rendering quality of the initial sub-pixel position and the rendering quality of the first sub-pixel position exceeds the desired rendering quality difference threshold 552 (e.g., comprising a low threshold and a high threshold), the resulting glyph rendering may be "over-sharp." Therefore, in this example, the first sub-pixel position may not be selected for rendering the glyph.

If the rendering quality of the first sub-pixel position meets the desired rendering quality difference threshold 552 (YES at 506) the rendering quality first sub-pixel position may be compared with a desired rendering quality for the glyph. As one example, as described above, the desired rendering quality for the glyph may comprise a highest rendering quality from a set of one or more sub-pixel positions (e.g., comprising a second sub-pixel position, a third sub-pixel position, and/or a fourth sub-pixel position, and so-on) (e.g., so that merely the "best" sub-pixel position is chosen for the parameters provided).

If the rendering quality of the first sub-pixel position does not meet the desired rendering quality for the glyph (NO at 508) the first sub-pixel position may not be selected for rendering the glyph, at 514 (e.g., and one of the other sub-pixel positions in the set may be selected, if it meets the desired rendering quality for the glyph). If the rendering quality of the first sub-pixel position meets the desired rendering quality for the glyph (YES at 508) the first sub-pixel position may be selected for a sub-pixel position shift, at 510. As one example, the sub-pixel position shift can be determined by identifying a number of sub-pixel positions between the initial sub-pixel position and the first sub-pixel position.

At 512, the glyph can be rendered using the identified sub-pixel position shift. As one example, the sub-pixel position shift may be used to adjust a position of the glyph from the initial sub-pixel position when the glyph is rendered, such as on a display. In this way, for example, the resulting rendered glyph may comprise a desired view on the display, which incorporates, at least, desired typographical preferences for the glyph (e.g., font preferences).

In one aspect, rendering quality of a set of glyphs (e.g., characters of a font) may be improved by storing desired sub-pixel position shifts for the set. As one example, a set of sub-pixel position shifts, corresponding to a set of glyphs, which provide a desired (e.g., best) view of the set of glyphs can be stored for a particular font (e.g., or display type that may be rendering the font), and later used when the set is subsequently rendered. In one embodiment, a sub-pixel position shift that is selected for the glyph can be stored (e.g., locally on a client machine, and/or remotely on a storage server). Further, in one embodiment, a provision for editing of the sub-pixel position shift for the glyph, for example, can be made available to a user, such that the user may update the shift according to their preferences (e.g., where such an update may also be stored locally or remotely for subsequent use). Additionally, in one embodiment, the stored sub-pixel position shift (e.g., edited or unedited) can be used to render the glyph (e.g., subsequently, on the display).

In this aspect, for example, desired sub-pixel shifts may be stored (e.g., as a part of a font file or as part of cache) rather than being re-calculated at run-time. As one example, storing one or more desired sub-pixel shifts can be memory-efficient, even if the shifts are stored in a cache. In this example, a glyph may utilize a same over-scaled bitmap and, in this case, all that may need to be stored is one shift per sub-pixel position. Further, as an example, storing one or more desired sub-pixel shifts for a set of glyphs may allow for more complex (e.g., and more time consuming) evaluations of various typographic characteristics and/or characteristics of global nature to be performed at rendering. Additionally, as one example, if the shifts are stored in a file (e.g., font file), a user (e.g., type designer) may be able to perform simple editing, which may provide a way to extend hinting to handle sub-pixel positioned text.

A system may be devised that can mitigate loss of quality experienced by typical glyph rendering techniques. Instead, the glyph may be rendered in a desired view, for example, that may reduce "over-blurring" of a character. A typical glyph can comprise an initial rendering position for a particular display, comprising a sub-pixel position. One or more alternate sub-pixel positions can be identified for rendering the glyph, from which, one may be selected to render the glyph. The selected sub-pixel position can be chosen by identifying a rendering quality of the glyph at the one or more alternate sub-pixel positions, and the initial position, and selecting the sub-pixel position that provides the desired view of the glyph. The glyph may then be rendered using the selected sub-pixel position, for example.

Figure 6:
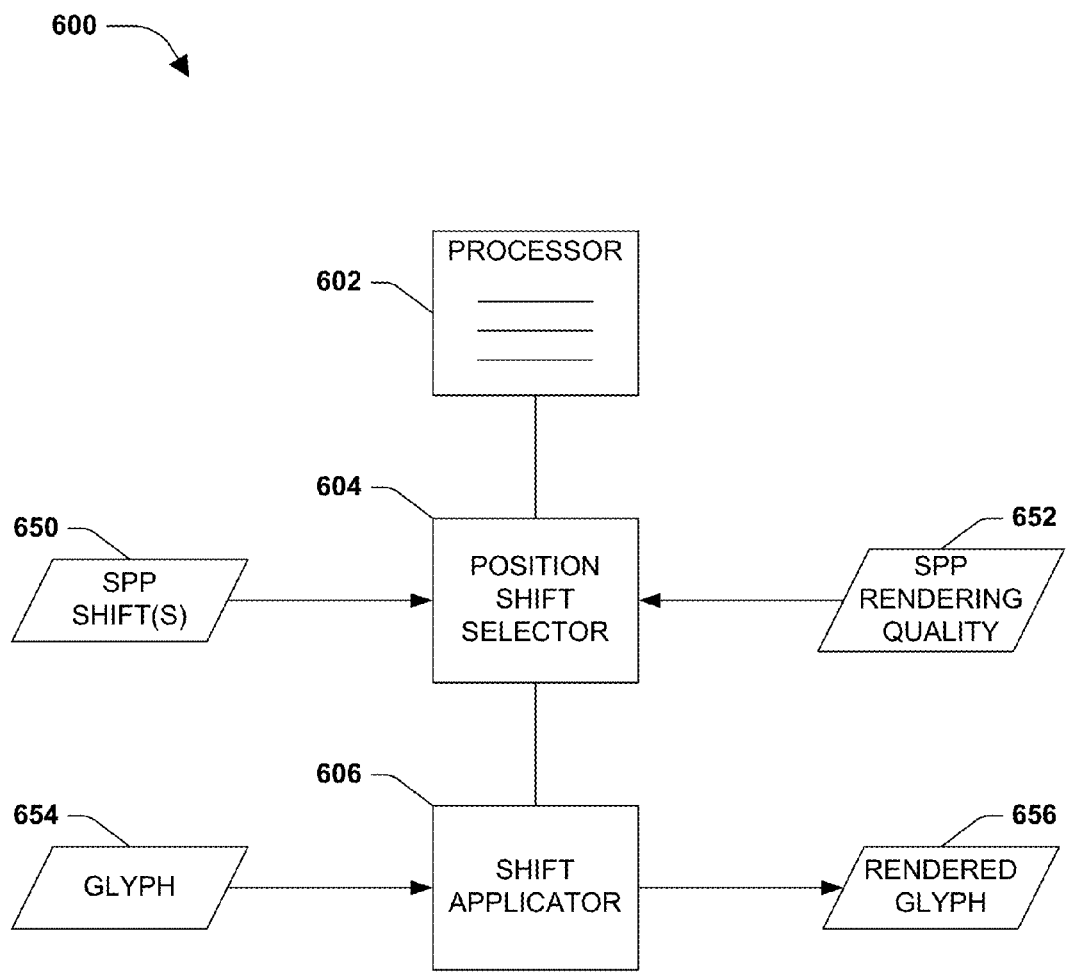
FIG. 6 is a component diagram illustrating an exemplary system for rendering a glyph.

FIG. 6 is a component diagram illustrating an exemplary system 600 for rendering a glyph. In the exemplary system 600, a computer-based processor 602, configured to process data for the system, is operably coupled with a position shift selection component 604. The position shift selection component 604 is configured to select a sub-pixel position (SPP) shift 650 for a received glyph based at least upon a glyph rendering quality 652 for the glyph at a second sub-pixel position. The selected sub-pixel position shift comprises a difference between a first sub-pixel position for the glyph and the second sub-pixel position.

In the exemplary system 600, a shift application component 606 is configured to apply the selected sub-pixel position shift to the glyph 654 at rendering time. As one example, the shift application component 606 can apply the selected sub-pixel position shift to the initial sub-pixel position for the glyph, resulting in a rendered glyph 656 at the second sub-pixel position. In this way, for example, the resulting rendered glyph 656 may comprise a desired view, based on selecting the sub-pixel position shift that comprises a desired rendering quality.

Figure 7:
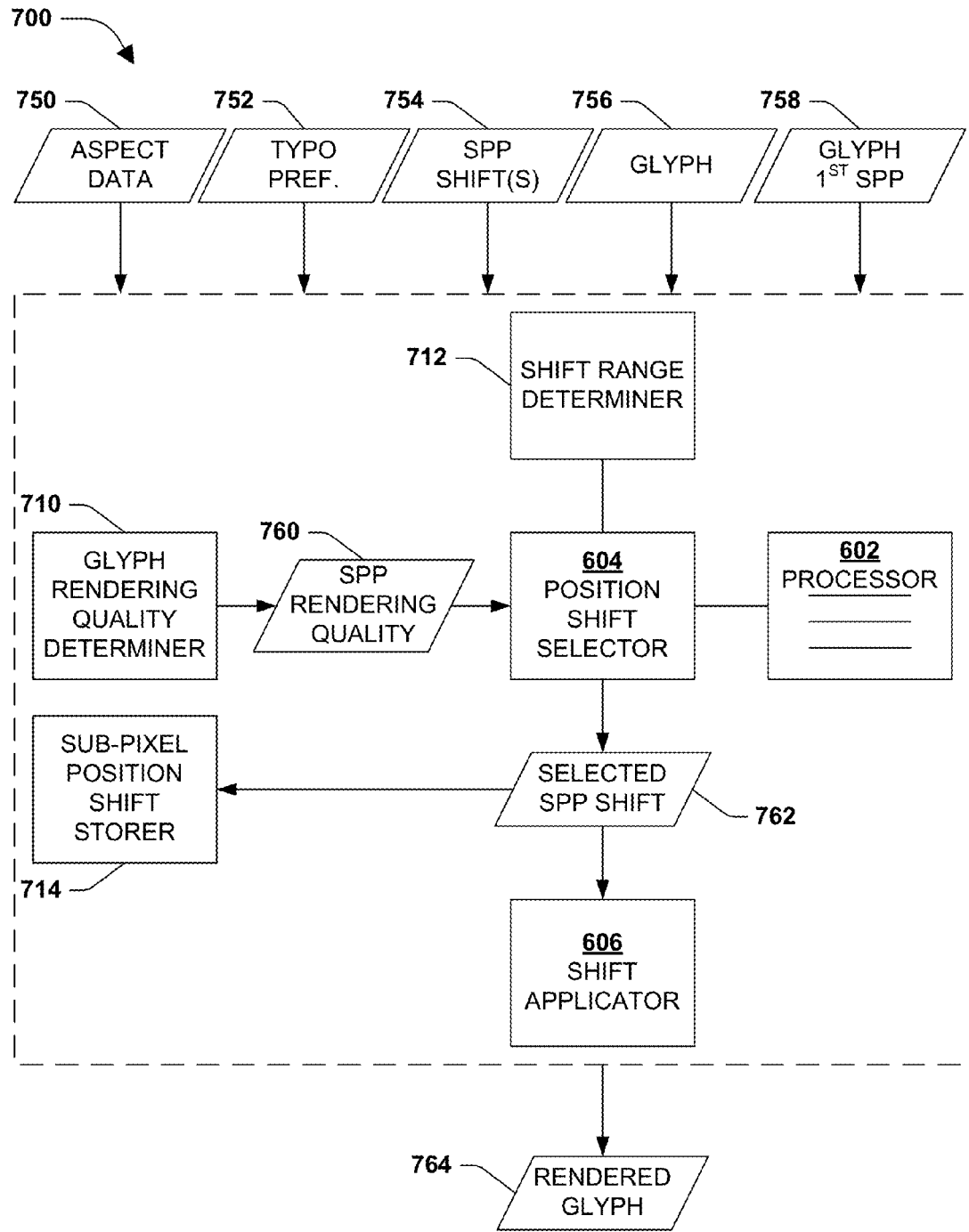
FIG. 7 is a component diagram illustrating an example embodiment where one or more systems described herein may be implemented.

FIG. 7 is a component diagram illustrating an example embodiment 700 where one or more systems described herein may be implemented. In this example 700, an extension of FIG. 6 is provided and thus description of elements, components, etc. described with respect to FIG. 6 may not be repeated for simplicity. In one embodiment, a first sub-pixel position 758 can comprises a received initial rendering position for the glyph. That is, for example, glyph rendering data may be received (e.g., by the example system 700), where the glyph rendering data comprises an initial position for rendering the glyph 756 on a particular display, along with other rendering data (e.g., size, shape, color, characteristics, etc.).

In the example embodiment 700, a glyph rendering quality determination component 710 can be configured to determine the rendering quality 760 for the glyph at a second sub-pixel position, and/or a rendering quality 760 of the glyph at the first sub-pixel position, using glyph aspect data 750, typographical preferences 752 for the glyph, potential sub-pixel position shift(s) 754 for the glyph, the glyph 756 itself and the first sub-pixel position 758 for the glyph. The glyph rendering quality determination component 710 may determine one or more glyph rendering qualities based on a brightness of a first portion of the glyph 756, where the brightness may comprise a lumina value. Further, the glyph rendering quality determination component 710 may determine one or more glyph rendering qualities based on a contrast of the first portion of the glyph 756, where the contrast may comprise a brightness difference between a first element of the first portion of the glyph and a second element of the first portion of the glyph.

Additionally, the glyph rendering quality determination component 710 may determine one or more glyph rendering qualities based on a typographic preference 752 for the glyph. In one embodiment, the typographic preference 752 can comprise a characteristic of a shape of the glyph (e.g., straight vertical and/or horizontal lines, and/or curves, etc.), which may affect how the glyph is rendered. In one embodiment, the typographic preference 752 can comprise a font spacing for the glyph, for example, comprising a distance between characters of a font. In one embodiment, the typographic preference 752 can comprise a desired preference for rendering one or more runs of the glyph, such as where a glyph may comprise two or more vertical stems (e.g., "n" or "m").

In one embodiment, the glyph rendering quality determination component 710 may determine one or more glyph rendering qualities based on an edge quality for the first portion of the glyph. For example, an edge quality may comprise a desired "sharpness" of an edge of a glyph, where the edge is not "over-blurred" and/or not "over-sharp," such as to provide a desired viewing experience to a user. In one embodiment, the glyph rendering quality determination component 710 may determine one or more glyph rendering qualities based on a spatial accuracy of the first portion of the glyph. For example, "over-shifting" the sub-pixel position for rendering a glyph may result in merging of two adjacent glyphs, and/or undesirable spacing between glyphs.

Figure 8:
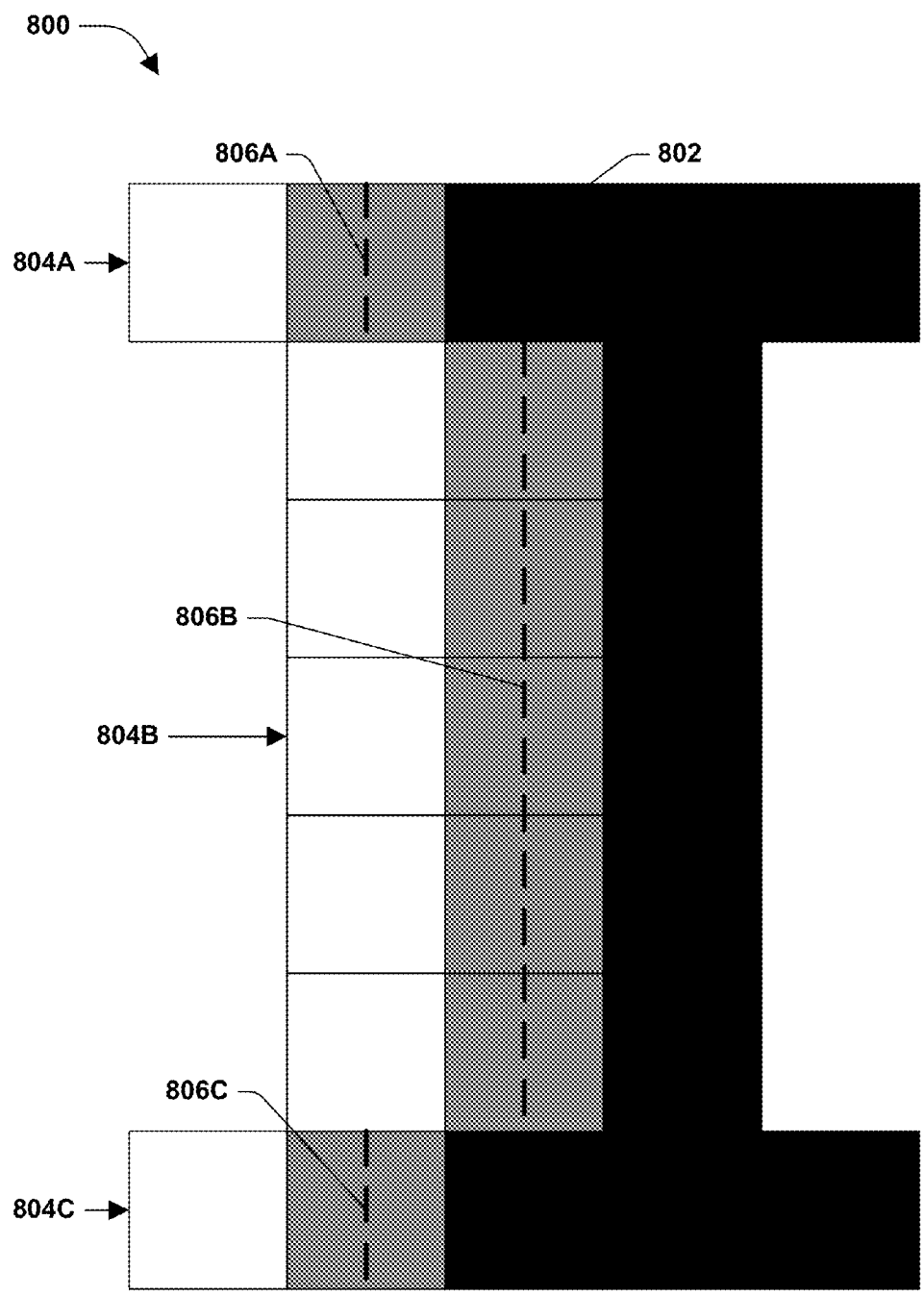
FIG. 8 is an illustration of an example embodiment of a glyph where a similarity scale may be applied.

In one embodiment, the glyph rendering quality determination component 710 may determine one or more glyph rendering qualities based on a similarity scale. As one example, the similarity scale can comprise a measure of run similarity between the first portion and a second portion of the glyph. As an illustrative example, FIG. 8 illustrates an example embodiment 800 of a glyph where a similarity scale may be applied. In this example embodiment 800, a first side of the glyph 802 (e.g., capital letter "I") comprises a first 804A, second 804B and third 804C vertical run, respectively comprising a similar horizontal arrangement of pixels along corresponding borders 806A, 806B, 806C. That is, for example, respective borders 806A, 806B, 806C comprise a white shade to the left, a gray shade in the middle, and a black shade to the right. In one embodiment, the glyph rendering quality determination component 710 may determine that the second vertical run 804B may comprise a less desired arrangement, for example, because the same horizontal arrangement of pixels (e.g., white, gray, black) for the second vertical run 804B spans along a longer vertical border than in the first 804A and third 804C vertical runs. That is, because the white, gray, black arrangement may make the (relatively 'thin') second vertical run 804B appear blurry (and because so much of the "I" is comprised by this run), the second vertical run 804B may be regarded as a less desired arrangement (e.g., relative to the first and second "shorter" vertical runs 804A and 804C, for which the white, gray, black arrangement may be more acceptable). In one example, a weighting penalty may thus be applied to the (e.g., pixels) of the second vertical run 804B.

The example embodiment 700 comprises a shift range determination component 712, which can be configured to identify a shift range for the glyph. As one example, the shift range for the glyph can comprise a range of potential sub-pixel shifts (e.g., +/−a number of sub-pixel positions from the initial sub-pixel position), from which a sub-pixel position may be selected for rendering the glyph (e.g., as a threshold range). In one embodiment, the position shift selection component 604 can be configured to select the sub-pixel position shift 762 for the glyph 756 if the sub-pixel position shift 762 is comprised in the shift range.

The example embodiment 700 comprises a selected sub-pixel position shift storage component 714, which can be configured to store the selected sub-pixel position shift 762 for the glyph, where the stored sub-pixel position shift 762 can be used for subsequent renderings of the glyph 764. That is, for example, a first sub-pixel position shift (e.g., which may comprise zero, indicative of the initial sub-pixel position) may be selected for a first glyph, a second sub-pixel position shift may be selected for a second glyph, and/or a third sub-pixel position shift may be selected for a third glyph (e.g., and so-on for a fourth, fifth, etc.), and the set of selected sub-pixel positions shifts can be stored (e.g., locally and/or remotely) for the set of corresponding glyphs. In this example, when the one or more of the glyphs from the set are subsequently rendered, the stored set of sub-pixel positions shifts may be used to render the glyphs at the desired sub-pixel positions.

Figure 9:
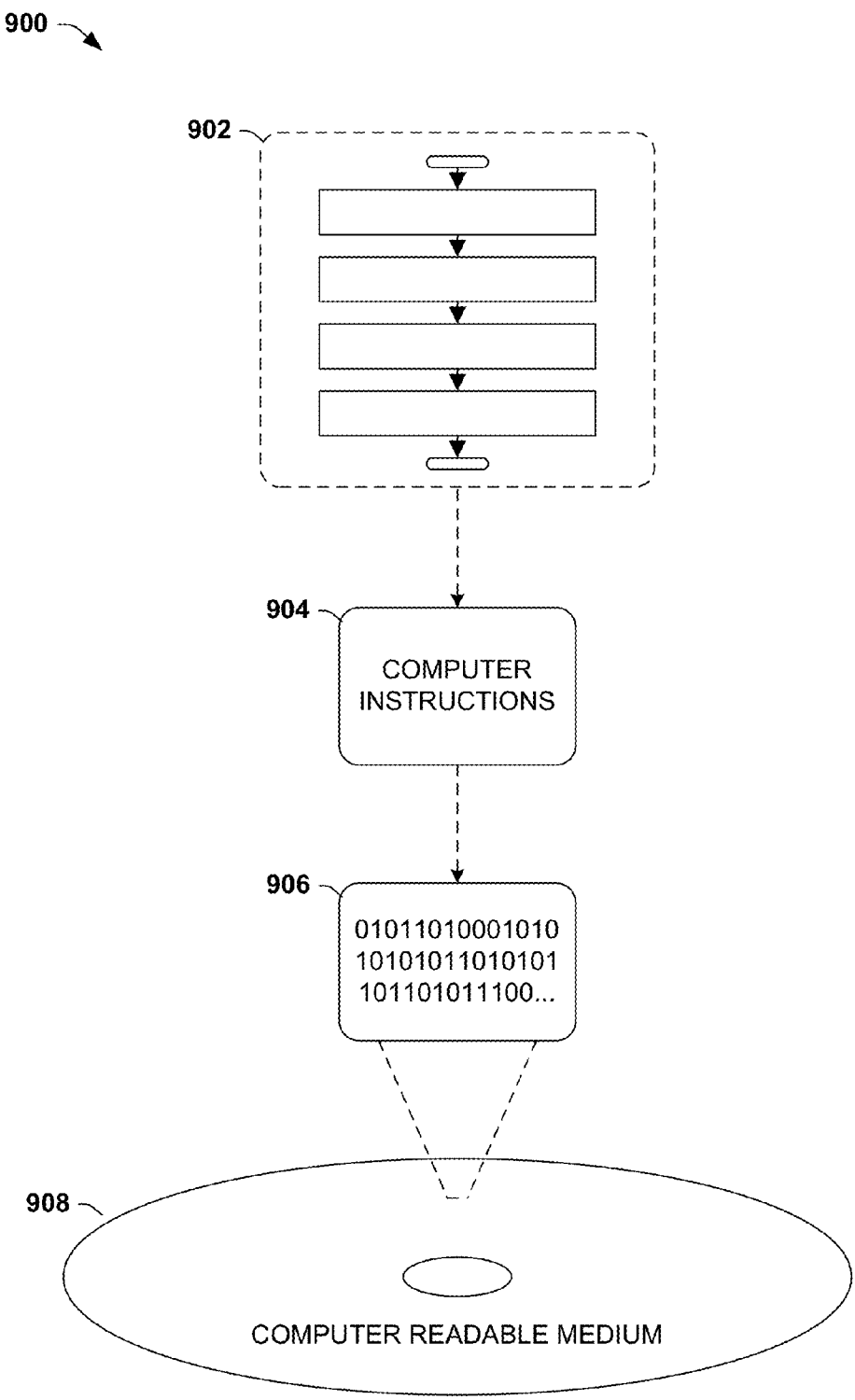
FIG. 9 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 9, wherein the implementation 900 comprises a computer-readable medium 908 (e.g., a CD-R, DVD-R, or a platter of a hard disk drive), on which is encoded computer-readable data 906. This computer-readable data 906 in turn comprises a set of computer instructions 904 configured to operate according to one or more of the principles set forth herein. In one such embodiment 902, the processor-executable instructions 904 may be configured to perform a method, such as at least some of the exemplary method 200 of FIG. 2, for example. In another such embodiment, the processor-executable instructions 904 may be configured to implement a system, such as at least some of the exemplary system 600 of FIG. 6, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system," "interface," and the like are generally intended to refer to a computer-related entity, either hardware, a combination of hardware and software, software, or software in execution. For example, a component may be, but is not limited to being, a process running on a processor, a processor, an object, an executable, a thread of execution, a program and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device, carrier or media. Of course, those skilled in the art will recognize many modifications may be made to this configuration without departing from the scope or spirit of the claimed subject matter.

Figure 10:
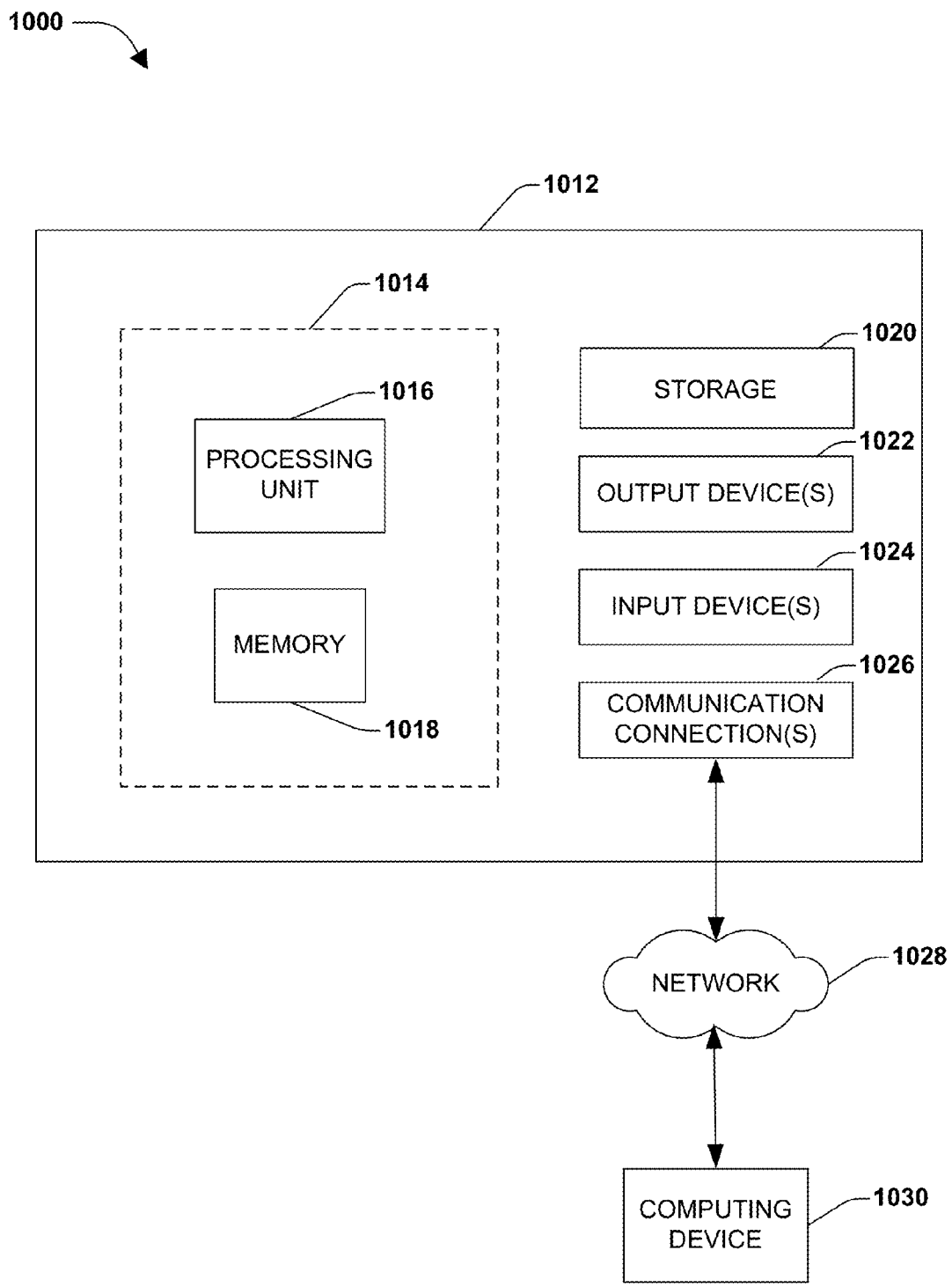
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1000 comprising a computing device 1012 configured to implement one or more embodiments provided herein. In one configuration, computing device 1012 includes at least one processing unit 1016 and memory 1018. Depending on the exact configuration and type of computing device, memory 1018 may be volatile (such as RAM, for example), non-volatile (such as ROM, flash memory, etc., for example) or some combination of the two. This configuration is illustrated in FIG. 10 by dashed line 1014.

In other embodiments, device 1012 may include additional features and/or functionality. For example, device 1012 may also include additional storage (e.g., removable and/or non-removable) including, but not limited to, magnetic storage, optical storage, and the like. Such additional storage is illustrated in FIG. 10 by storage 1020. In one embodiment, computer readable instructions to implement one or more embodiments provided herein may be in storage 1020. Storage 1020 may also store other computer readable instructions to implement an operating system, an application program and the like. Computer readable instructions may be loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer storage media may be part of device 1012.

Device 1012 may also include communication connection(s) 1026 that allows device 1012 to communicate with other devices. Communication connection(s) 1026 may include, but is not limited to, a modem, a Network Interface Card (NIC), an integrated network interface, a radio frequency transmitter/receiver, an infrared port, a USB connection or other interfaces for connecting computing device 1012 to other computing devices. Communication connection(s) 1026 may include a wired connection or a wireless connection. Communication connection(s) 1026 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1012 may include input device(s) 1024 such as keyboard, mouse, pen, voice input device, touch input device, infrared cameras, video input devices, and/or any other input device. Output device(s) 1022 such as one or more displays, speakers, printers, and/or any other output device may also be included in device 1012. Input device(s) 1024 and output device(s) 1022 may be connected to device 1012 via a wired connection, wireless connection, or any combination thereof.

In one embodiment, an input device or an output device from another computing device may be used as input device(s) 1024 or output device(s) 1022 for computing device 1012.

Components of computing device 1012 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1012 may be interconnected by a network. For example, memory 1018 may be comprised of multiple physical memory units located in different physical locations interconnected by a network.

Those skilled in the art will realize that storage devices utilized to store computer readable instructions may be distributed across a network. For example, a computing device 1030 accessible via network 1028 may store computer readable instructions to implement one or more embodiments provided herein. Computing device 1012 may access computing device 1030 and download a part or all of the computer readable instructions for execution. Alternatively, computing device 1012 may download pieces of the computer readable instructions, as needed, or some instructions may be executed at computing device 1012 and some at computing device 1030.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for rendering a glyph, comprising:
   receiving the glyph and a first sub-pixel position for the glyph;
   identifying a rendering quality for the glyph at a second sub-pixel position based at least upon a determined brightness value aspect for at least a portion of the glyph to be rendered at the second sub-pixel position, a determined contrast value aspect for the at least a portion of the glyph and a determined typographical preference aspect for the at least a portion of the glyph;
   selecting a sub-pixel position shift for the glyph based at least upon the rendering quality, the sub-pixel position shift comprising a difference between the first sub-pixel position and the second sub-pixel position; and
   rendering the glyph on a display comprising applying the sub-pixel position shift to the glyph.

2. The method of claim 1, the identifying based at least upon a spatial accuracy, associated with the glyph, as compared with a desired spatial accuracy range.

3. The method of claim 2, the spatial accuracy within the desired spatial accuracy range.

4. The method of claim 1, the glyph associated with a character.

5. The method of claim 1, the rendering quality for the glyph at the second sub-pixel position further identified based on a weighted sum of the brightness value aspect, the contract value aspect and the typographical preference aspect.

6. The method of claim 5, each of the brightness value aspect, the contract value aspect and the typographical preference aspect having a weighting factors.

7. The method of claim 6, a determination of at least one of the weighting factors being based on a type of the display.

8. The method of claim 1, the identifying comprising combining a first adjusted weighted rendering quality for a first portion of the glyph and a second adjusted weighted rendering quality for a second portion of the glyph.

9. The method of claim 8, comprising identifying the first portion and the second portion.

10. The method of claim 1, the selecting comprising selecting the sub-pixel position shift based at least upon a desired typographic preference for the glyph.

11. The method of claim 1, the selecting comprising one or more of:
    determining whether the sub-pixel position shift is comprised in a desired shift range; or
    determining whether the sub-pixel position shift meets a desired rendering quality difference threshold.

12. The method of claim 11, comprising determining the desired shift range based at least upon one or more of:
    the desired rendering quality difference threshold; or
    a desired typographic preference for the glyph.

13. The method of claim 1, comprising one or more of:
    storing the sub-pixel position shift; or
    providing for editing of the sub-pixel position shift.

14. A system for rendering a glyph, comprising:
    one or more processing units; and
    memory comprising instructions that when executed by at least one of the one or more processing units, implement at least some of:
       a glyph rendering quality determination component configured to identify a rendering quality for the glyph at a second sub-pixel position based at least upon a determined brightness value aspect for at least a portion of the glyph to be rendered at the second sub-pixel position, a determined contrast value aspect for the at least a portion of the glyph and a determined typographical preference aspect for the at least a portion of the glyph;
       a position shift selection component configured to select a sub-pixel position shift for the glyph based at least upon the rendering quality; and
       a shift application component configured to apply the sub-pixel position shift to the glyph and render the glyph on a display.

15. The system of claim 14, the sub-pixel position shift comprising a difference between a first sub-pixel position and the second sub-pixel position.

16. The system of claim 14, the rendering quality for the glyph at the second sub-pixel position further identified based on a weighted sum of the brightness value aspect, the contract value aspect and the typographical preference aspect.

17. The system of claim 14, the instructions, when executed, implementing at least some of a shift range determination component configured to identify a shift range for the glyph.

18. The system of claim 17, the position shift selection component configured to select the sub-pixel position shift for the glyph if the sub-pixel position shift is comprised in the shift range.

19. The system of claim 14, the instructions, when executed, implementing at least some of a selected sub-pixel position shift storage component configured to store the sub-pixel position shift.

20. A computer readable medium, excluding signals, comprising instructions that when executed perform a method for rendering a glyph, comprising:
    receiving the glyph and a first sub-pixel position for the glyph;
    identifying a rendering quality for the glyph based at least upon a determined brightness value aspect for at least a portion of the glyph to be rendered at the second sub-pixel position, a determined contrast value aspect for the at least a portion of the glyph and a determined typographical preference aspect for the at least a portion of the glyph;
    selecting a sub-pixel position shift for the glyph based at least upon the rendering quality; and
    rendering the glyph on a display comprising applying the sub-pixel position shift to the glyph.

* * * * *